(12) United States Patent
Castilho et al.

(10) Patent No.: US 10,511,634 B2
(45) Date of Patent: *Dec. 17, 2019

(54) SCALABLE CLOUD-BASED ENDPOINT SECURITY SYSTEM

(71) Applicant: Malwarebytes Inc., Santa Clara, CA (US)

(72) Inventors: Marcio Castilho, Palm Harbor, FL (US); Kevin Breton, Palmetto, FL (US); Jonathan Chan, Brooklyn, NY (US); Anupam Bandyopadhyay, Tampa, FL (US); Plamen Stoyanov, St. Petersburg, FL (US)

(73) Assignee: Malwarebytes Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/883,077

(22) Filed: Jan. 29, 2018

(65) Prior Publication Data

US 2019/0036967 A1 Jan. 31, 2019

Related U.S. Application Data

(63) Continuation of application No. 15/665,368, filed on Jul. 31, 2017, now Pat. No. 9,935,984.

(51) Int. Cl.
*H04L 29/06* (2006.01)
*H04L 12/24* (2006.01)
*G06F 21/57* (2013.01)

(52) U.S. Cl.
CPC ............ *H04L 63/20* (2013.01); *G06F 21/57* (2013.01); *H04L 41/082* (2013.01); *H04L 63/10* (2013.01); *H04L 63/0263* (2013.01)

(58) Field of Classification Search
CPC ....... H04L 63/20; H04L 41/082; H04L 63/10; H04L 63/0263; G06F 21/57
See application file for complete search history.

(56) References Cited

U.S. PATENT DOCUMENTS

| 2012/0173610 A1 | 7/2012 | Bleau et al. |
| 2012/0198038 A1 | 8/2012 | Porter et al. |

(Continued)

OTHER PUBLICATIONS

Malwarebytes Anti-Malware Unmanaged Client Administrator Guide Version 1.80, Oct. 11, 2016, 48 pages. (Year: 2016).

(Continued)

*Primary Examiner* — Michael Pyzocha
(74) *Attorney, Agent, or Firm* — Fenwick & West LLP

(57) ABSTRACT

A scalable cloud-based endpoint security system facilitates a security policy on a plurality of endpoints. Configuration data or commands for implementing a security policy are entered via a web browser of an administrative client device and received at a cloud server. An API server generates a message to a queue of a publication/subscription server that publishes the messages from the queue to one or more subscribing communication servers. A communication server sends the message to an endpoint targeted by the message via a persistent connection that the communication server maintains with the endpoint. In response to the message, the endpoint establishes a connection to the API server. The API server then distributes the configuration data or commands to the endpoint.

20 Claims, 3 Drawing Sheets

(56) References Cited

U.S. PATENT DOCUMENTS

| | | |
|---|---|---|
| 2012/0290740 A1 | 11/2012 | Tewari et al. |
| 2013/0078951 A1 | 3/2013 | Mun et al. |
| 2013/0298185 A1 | 11/2013 | Koneru et al. |
| 2013/0326502 A1 | 12/2013 | Brunsman et al. |
| 2013/0332484 A1 | 12/2013 | Gajic |
| 2014/0053229 A1 | 2/2014 | Saib |
| 2014/0304700 A1 | 10/2014 | Kim et al. |
| 2015/0004949 A1 | 1/2015 | Fienberg et al. |
| 2015/0237498 A1 | 8/2015 | Freedman et al. |
| 2015/0324180 A1 | 11/2015 | Tredoux et al. |
| 2016/0028677 A1 | 1/2016 | Narasimhan et al. |
| 2016/0119301 A1 | 4/2016 | Thilgen |
| 2016/0234307 A1 | 8/2016 | Yan et al. |
| 2017/0195339 A1 | 7/2017 | Brown |
| 2017/0201588 A1 | 7/2017 | Schmidt et al. |
| 2017/0310753 A1 | 10/2017 | Knothe et al. |
| 2018/0007140 A1* | 1/2018 | Brickell ................ H04L 67/125 |

OTHER PUBLICATIONS

Savade, Chetan, "Upgrade clients to SEP 12.1 by Auto upgrade feature", Jan. 13, 2012, 44 pages. (Year: 2012).
Symantec.TM. Data Center Security: Server, Server Advanced, and Monitoring Edition, REST API Reference Guide Version 6.6, 2016, 33 pages. (Year: 2016).
Symantec.TM. Endpoint Protection Manager 14 REST API Reference, 2017, 9 pages. (Year: 2017).

* cited by examiner

SCALABLE CLOUD-BASED ENDPOINT SECURITY SYSTEM

RELATED APPLICATIONS

This application is a continuation of U.S. patent application Ser. No. 15/665,368 filed on Jul. 31, 2017 which is incorporated by reference herein.

FIELD OF ART

The present disclosure relates generally to computer security and more specifically to a scalable cloud-based endpoint security system.

BACKGROUND

Malware is constantly evolving and therefore software designed to combat malware must be updated regularly. In large-scale systems, it is often challenging to distribute updates to large numbers of connected endpoint devices in an automatic and efficient way. It is furthermore difficult to scale the infrastructure needed to update those systems as more connected endpoints are added. The problem becomes even more challenging when endpoints are not connected to the same local area network as the enterprise security server that manages security policies and provides updates.

SUMMARY

A method is disclosed for updating a security policy on an endpoint client device in a networked computer environment. A command including configuration data for configuring a plurality of endpoints within an enterprise network is received at an applicant programming interface (API) server. A connection request message is sent to a queue of a publication/subscription (pub/sub) server. This connection request message identifies the plurality of endpoints target by the command. The connection request message is published by the pub/sub server from the queue to a subscribing communication server. The communication server maintains a persistent connection to a subset of the plurality of endpoints. The communication server receives the connection request message and identifies a target endpoint identified by the connection request message in the subset of the plurality of endpoints. The communication server then sends the connection request message to the identified endpoint via the persistent connection. The API server receives a connection request from the identified endpoint in response to the identified endpoint receiving the connection request message. A temporary connection is established between the API server and the identified endpoint in response to the request. The API server communicates the command to the identified endpoint over the temporary connection. Following the communication, the temporary connection is terminated.

BRIEF DESCRIPTION OF THE DRAWINGS

The figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A scalable cloud-based endpoint security system facilitates implementation of a security policy on a plurality of endpoints. The security system is beneficially implemented in a cloud environment instead of on a local server on an enterprise local area network. The cloud implementation enables a highly scalable system that can accommodate any number of endpoints and can dynamically adapt as the number of endpoints changes.

Figure 1:
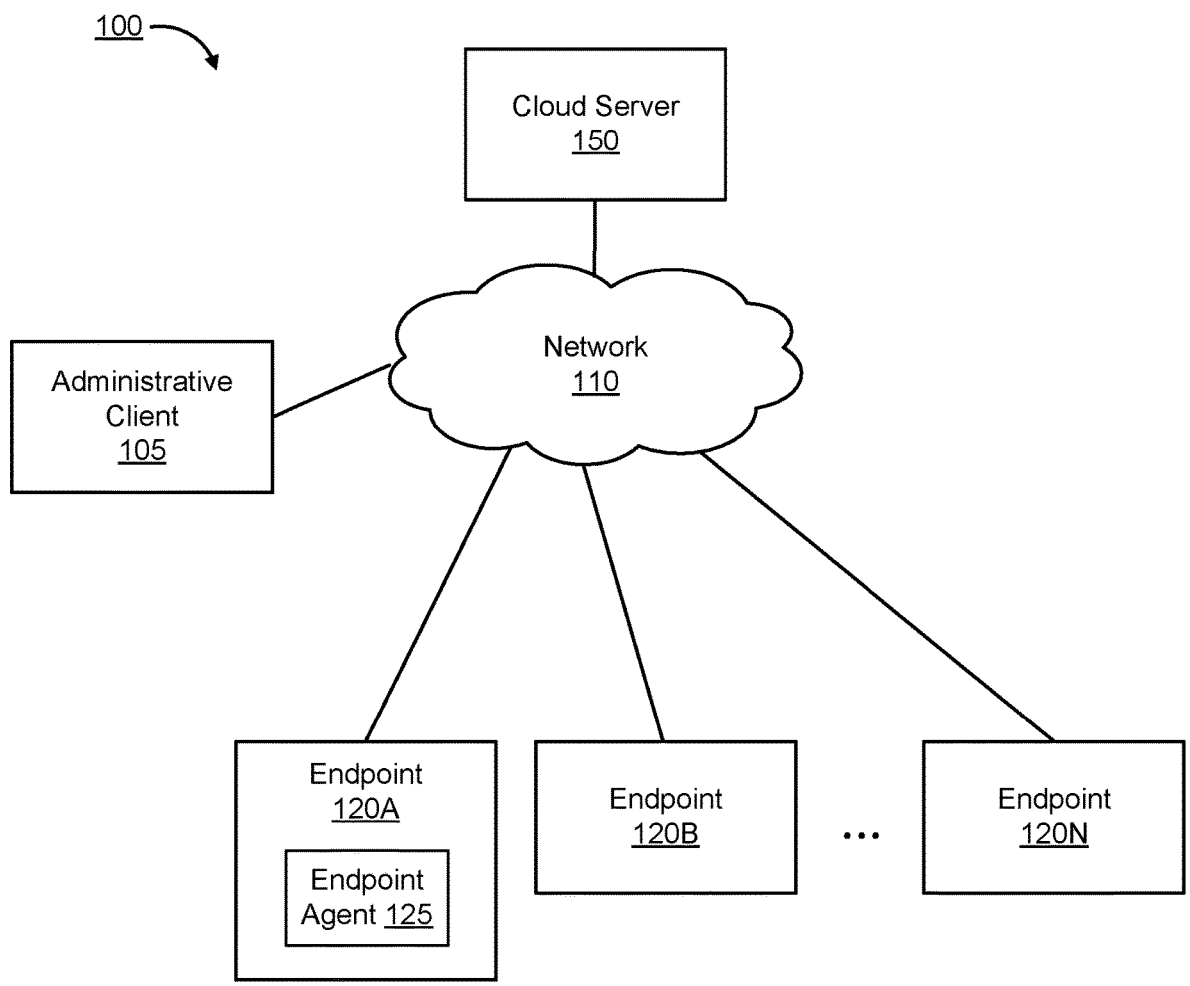
FIG. 1 is a high-level block diagram illustrating an embodiment of a system environment for managing a set of computing devices.

FIG. 1 is a high-level block diagram illustrating a system environment 100 for managing a set of computing devices. The system environment 100 comprises an administrative client 105, a network 110, a cloud server 150, and a set of endpoint computing devices (hereafter referred to as "endpoints") 120. The system environment 100 may include different or additional entities.

The administrative client 105 is a computer system configured to receive inputs from a network administrator to configure a network security policy associated with an enterprise and communicate the network security policy to the cloud server 150 via the network 110. The administrative client 105 may furthermore retrieve information relating to the network security policy from the cloud server 150 via the network 110 and present the information relating to the network security policy. In an embodiment, the administrative client 105 executes a web browser application to access an administrative web page hosted by the cloud server 150. The web page may be secured by requiring log in credentials or another authentication technique to limit access to the administrative web page to a device or individual having appropriate privileges. The administrative web page may enable the administrator, via the administrative client 105, to configure various security settings for the endpoints 120 on the network 110, access status information relating to the endpoints, issue commands to the endpoints, or perform other administrative tasks relating to the security policy.

The network 110 represents the communication pathways between the administrative client 105, the cloud server 150, and the endpoints 120. In one embodiment, the network 110 includes a wide area network (e.g., the Internet). The network 110 can also include one or more enterprise local area networks that utilize dedicated or private communications links that are not necessarily part of the Internet. For example, an enterprise computing environment may include endpoints 120 residing on different local area networks associated with the same enterprise. An administrative client 105 may also reside on a local area network associated with the enterprise. A wide area network (e.g., the Internet) may connect the one or more local area networks of the enterprise to each other and with the cloud server 150. Other endpoints 110 may be coupled to the wide area network without necessarily being coupled to the local area network.

In one embodiment, the network 110 uses standard communications technologies and/or protocols. Thus, the network 110 can include links using technologies such as Ethernet, Wi-Fi (802.11), integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), long term evolution (LTE), code division multiple access 2000 (CDMA2000), and/or wide-band CDMA (WCDMA). The data exchanged over the network 110 can be represented using technologies and/or formats including the hypertext markup language (HTML), the extensible markup language (XML), the wireless access protocol (WAP), the short message service (SMS) etc.

The data on the network 110 may also be communicated via a persistent low overhead connection such as Web Socket connection. The Web Socket protocol enables full duplex communication over a single TCP connection. The Web Socket protocol facilitates real-time data transfers via a standardized protocol that enables a server to send content to a client without being solicited by the client, and allows messages to be communicated in both directions while keeping the connection open.

In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Each endpoint 120 comprises one or more computing devices capable of processing data as well as transmitting and receiving data via the network 110. For example, an endpoint 120 may be a desktop computer, a laptop computer, a mobile phone, a tablet computing device, an Internet of Things (IoT) device, or any other device having computing and data communication capabilities. In the illustrated embodiment, there are N endpoints, where N may comprise any number of end points (e.g., tens, hundreds, or thousands of endpoints 120 or more). Furthermore, the number of endpoints 120 may change over time as endpoints come online and go offline. The endpoints 120 are each configured to execute an endpoint security agent 125 (e.g., a security application) that protects the endpoints from malware. For example, the endpoint agent 125 may include capabilities such as a real-time protection capability to prevent the downloading or installation of malware, a scanning capability to detect existing malware on the endpoint 120, and a remediation capability to quarantine and remove detected malware. The endpoint agent 125 may furthermore receive commands from the cloud server 150 to cause the endpoint agent 125 to execute a security-related function such as running a scheduled scan, updating a plugin that implements various security features, and updating malware definitions used to detect malware.

The cloud server 150 facilitates implementation of a security policy on a plurality of endpoints 120 that form part of an enterprise network. Implementing the security policy may include, for example, deploying or updating the endpoint agents 125 on the endpoints 120, configuring the endpoint agents 125 based on the security policy, sending commands to the endpoints to perform various tasks such as running scans or remediating vulnerabilities, and obtaining various security-related data from the endpoints such as state information or scan results. The security policy may be modified via commands received from the administrative client 105 as described above. A logical diagram illustrating an example embodiment of a cloud server 150 is described in greater detail in the description of FIG. 2 below.

Unlike a conventional enterprise security server that typically resides on a local area network of the enterprise and may be physically co-located with the local area network and the endpoints 120, the cloud server 150 instead may reside in a cloud environment remote from the enterprise local area network and connected to it via a wide area network such as the Internet. The cloud environment in which the cloud server 150 executes may be maintained by a third-party cloud computing provider that provides shared computer processing and data storage resources to the enterprise in an on-demand fashion. In this cloud environment, the cloud server 150 is not necessarily implemented on a single physical server and does not necessarily comprise only a single physical storage device. Instead, the cloud server 150 may be implemented as one or more physical servers, one or more virtual servers, or a combination of physical and virtual servers.

Controlling security policies by a cloud server 150 in a cloud environment has several advantages over a conventional security architecture in which a local security server operates on a local area network of the enterprise. First, controlling an enterprise security policy by the cloud server 150 in the cloud environment simplifies the ability of third-party providers to administer some or all aspects of the enterprise security policy because the third-party provider does not need direct access to the enterprise local area network. Thus, an enterprise can more easily offload some of the administrative burden of managing enterprise security to a dedicated third party service. Second, controlling an enterprise security policy at the cloud server 150 in the cloud environment may simplify control over endpoints 120 that are not on the enterprise local area network but are connected to the Internet because communications do not have to go through the a firewall of the local area network. Thus, an enterprise may avoid having to update endpoints via virtual private network (VPN) connections or other complex networking tools. Third, implementing the security server as a cloud server 150 in the cloud environment simplifies scalability of the system as the number of endpoints 120 changes. For example, instead of an enterprise having to acquire and configure more physical servers as the number of endpoints 120 increases and the capacity limits are reached, the enterprise may simply obtain control of additional available computing resources in the cloud environment. Using existing third-party cloud computing services, this type of scaling can be achieved in a seamless and substantially automated manner without significant burden on the administrator.

While the system environment 100 is discussed herein as serving a single enterprise, the environment 100 may include multiple instances of the cloud server 150 each serving different enterprises and having different managed endpoints 120. Furthermore, a single cloud server 150 may serve multiple different enterprises managing different sets of endpoints 120 according to different security policies configured by respective administrative clients 105. Additionally, computing and storage resources of the cloud server 150 may be shared with other enterprises and used in an on-demand fashion.

Figure 2:
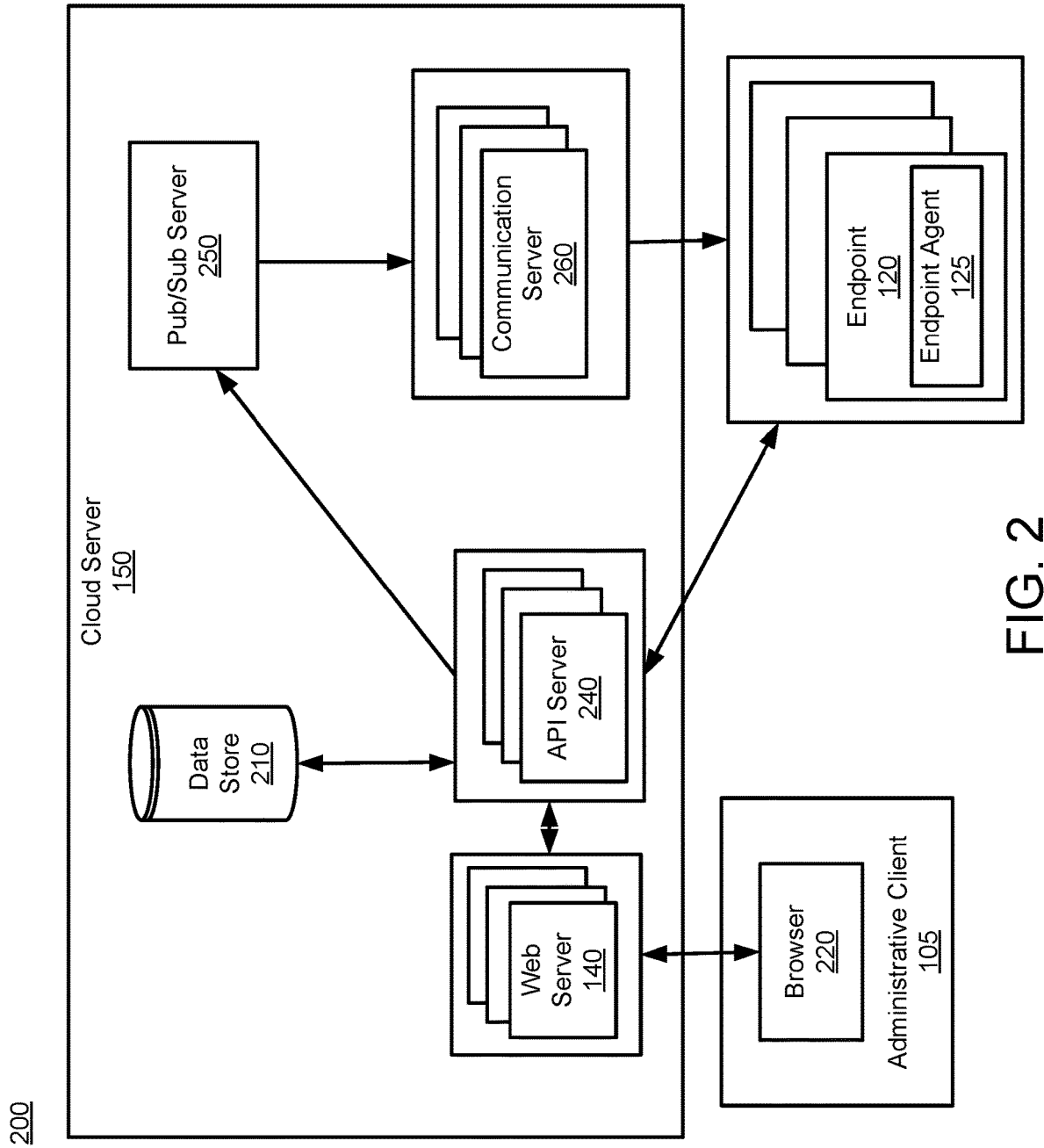
FIG. 2 is a diagram illustrating an embodiment of a cloud server for a cloud-based endpoint security system.

FIG. 2 is a block diagram illustrating an example embodiment of a cloud server 150 communicating with a browser 220 of the administrative client 105 and the endpoints 120. The cloud server 150 comprises one or more instances of a web server 140, a data store 210, one or more instances of an application programming interface (API) server 240, a publication/subscription (pub/sub) server 250, and one or more instances of a communication server 260.

In the diagram of FIG. 2, the connections represent logical connections between components and do not necessarily represent direct physical connections. For example, the connections may occur over a network. Furthermore, the servers 140, 240, 250, 260 and store 210 of the cloud server 150 illustrated in FIG. 2 represent functional components of the cloud server 150 and do not necessarily represent different physical servers. For example, the servers 140, 240, 250, 260 may each be implemented as a virtual server. Multiple virtual servers may execute on a single physical server or a single virtual server may be distributed across multiple physical servers. Furthermore, the data store 210 may comprise a cloud storage system that may occupy only a portion of a shared physical storage device or may be distributed across multiple physical storage devices.

The server components of the cloud storage 150 may be implemented as one or more processors and one or more non-transitory computer-readable storage media that store computer-readable storage instructions that when executed by the one or more processors, cause the one or more processors to carry out functions attributed to the respective servers 140, 240, 250, 260 described herein.

The browser 220 runs on the administrative client 105. The browser 220 is a conventional browser that runs on a client device and provides the administrator with a user interface with which to interact with the web server 140. The administrator uses a web site, accessed using the web server 140, to access an account with a unique account identifier. This account is used to send commands to the endpoints 120 (e.g., to configure the endpoints or perform a specified task). Configuration is done, for example, on a machine-by-machine basis, enterprise-wide, or on groups of endpoints. Configuration includes setting security policies (e.g., firewall policies, real-time protection policies), scheduling scans, and updating malware definitions. Furthermore, the configuration may provide machine identifiers for each of the endpoints 120 to be managed by the cloud server 150.

The web server 140 provides a web interface (e.g., a web page) that is accessible to the administrative client 105 using the browser 220. The web server 140 processes requests received from the browser 220 (e.g., via HTTP, HTTPS, or other protocol) and delivers one or more web pages to the administrative client in response to the requests. The one or more web pages may include an interface to enable an administrator to configure a security policy of the endpoints 120, send commands to the endpoints, or obtain various information from the cloud server 150 or endpoints. In an embodiment, multiple mirrored instances of the web server 140 may be available that each serve substantially identical web pages and can operate interchangeably. For example, different instances of the web-server 140 may serve different administrative clients 105 based on different geographical locations or other criteria.

The API server 240 provides business logic that facilitates implementation of the security policy. The API server 240 receives commands (e.g., to update a configuration or perform a specified task) from the web server 140 representative of inputs provided by the administrator via the browser 205. The API server 240 may communicate using an API comprising a limited predefined set of commands that can be processed by the API server 240. For example, in one embodiment, a REpresentational State Transfer (REST) abstraction may be used to implement the API. The API server 240 processes configuration changes to the security policy based on the commands and stores configuration changes to the data store 210. For example, the API server 240 may process the inputs to determine identifiers for a plurality of endpoints 120 that are targets of a command and update records associated with those endpoints in the data store 210. Configuration changes may include changes to a version of the endpoint agent 125 executing on the endpoints 120, changes to a firewall configuration, changes to a scheduled scanning frequency for scanning the endpoints for malware, disabling or enabling of various optional security features of the endpoints, changes to parameters controlling various real-time protection, scanning, or remediation tasks performed by the endpoint agent 125, or other security-related configurations. Other commands that can be issued to the endpoints 120 via the API server 240 may include, for example, initiating a manual scan on an endpoint 120 or requesting state information of an endpoint indicating, for example, an operating system executing on the endpoint, an version of the endpoint agent 125 executing on the endpoint, malware or vulnerabilities detected on the end point 120, remediation actions taken on the endpoint, a connectivity state of the endpoint, or other information relating to the current operating state of the endpoint.

Upon the API server 240 determining to send a command to one or more endpoints 120, the API server 240 sends a connection request message to the pub/sub server 250 that includes a machine identifier indicating an endpoint 120 that is the target of the message. The message may furthermore include an identifier for an instance of the API server 240 sending the message and a message identifier that uniquely identifies the message. In an embodiment, the message may furthermore include message type information indicating the type of data the API server 240 wants to send to the endpoint 120 (e.g., a configuration update, a scanning command, a status request, etc.). The API server 240 may store the message identifier to the data store 210 in association with the targeted endpoint 210 upon sending the message.

The API server 240 may also receive a connection request from an endpoint 120 and connect to the endpoint in response to the request. Once connected, the API server 240 may send the command and associated data (e.g., configuration data) to the endpoint 120 or receive information from the endpoint. Communications between the API server 240 and the endpoint 120 may utilize the commands in the API associated with the API server 240. In an embodiment, a connection between an endpoint 120 and the API server 240 is generally initiated by the endpoint in response to the endpoint receiving a connection request message described above, although the API server 240 may initiate the connection in certain situations. In order to reduce bandwidth requirements of the API server 240, the connections with the endpoints 120 may be made only when the endpoints have data to communicate to the API server 240 or when the endpoints request data from the API server 240. After the data is communicated, the connection may be terminated.

In an embodiment, the API server 240 and the endpoints 120 communicate with each other using hypertext transfer protocol (HTTP) over a transport layer security (TLS) protocol. The TLS protocol provides encrypted HTTP communications that enables data privacy and ensures data integrity.

In some embodiments, multiple instances of the API server 240 are utilized for scalability. Each instance of the API server 240 may perform identical functions and may operate in parallel to couple to different instances of the web servers 140 and to different endpoints 120. Instances of the API server 240 may be dynamically generated (e.g., as new virtual servers) as the number of endpoints 120 or other factors change. For example, new instances of the API server may be generated as virtual servers based on the number of endpoints 120 being administered by the cloud server 150 as specified in the data store 210. In an embodiment, a separate control server (not shown) may control scaling of the number of API servers 240 based on load, configuration parameters, throughput, or other factors. For example, if a large number of endpoints 120 are receiving an update at the same time, the control server may generate more instances of the API server 240 to accommodate the increased load, and then scale back down once the action is completed. In an embodiment, the control server may be administered by the third party cloud server host instead of by the enterprise in order to reduce the administrative burden of the enterprise. Alternatively, the enterprise may control scaling of the API server 240 by either automated or manual control (e.g., via the administrative client 105).

The pub/sub server 250 receives the messages from the one more instances of the API server 240 and stores the messages in a queue. In an embodiment, the queue of the pub/sub server 250 is a first-in, first-out (FIFO) queue. Alternatively, the queue may intelligently prioritize messages based on a type of message, the target of the message, or other factors. The pub/sub server 250 publishes messages from its queue to subscribing servers which may include one or more instances of the communication server 260.

The communication server 260 provides message processing capabilities to process messages received from the pub/sub server 250. Multiple instances of the communication server 260 can instantiated on the cloud server 150 with each communication server serving a subset of the endpoints 120 and maintaining a list of identifiers for the endpoints it serves. The number of communication servers 260 can be scaled based on the number of endpoints 120 and the volume of messages. In an embodiment, the number of communication servers 260 can adapt dynamically by automatically generating or terminating virtual servers based on the number of endpoints 120 (as specified in the data store 210) or other factors. In an embodiment, a separate control server (not shown) may control scaling of the number of communication servers 260 based on load, configuration parameters, throughput, or other factors. The control server may send a notification to the administrative client 105 indicating the change in number of communication servers 260. In an embodiment, the control server may be administered by the third party cloud server host instead of by the enterprise in order to reduce the administrative burden of the enterprise. Alternatively, the enterprise may control scaling of the communication servers 260 by either automated or manual control (e.g., via the administrative client 105).

Each instance of the communication server 260 may subscribe to all messages transmitted by the pub/sub server 250. Upon receiving a message, the communication server 260 determines whether or not it serves the endpoint specified as the target of the message (e.g., by comparing an identifier in the message against its stored list of endpoint identifiers). If the communication server 260 determines that the message is targeted to an endpoint 120 that it serves, the communication server 260 transmits the message to the appropriate endpoint.

Each instance of the communication server 260 maintains a persistent connection to the one or more endpoints 120 that it serves. The persistent connections between the communication server 260 and the endpoints 120 may be, for example, Web Socket connections. The persistent connection enables persistent connectivity and real-time or near real-time communication from the communication server 260 to a connected endpoint 120 without the endpoint having to request the data from the communication server. This enables the communication server 260 to provide the messages to the endpoints 120 quickly and with very low overload.

Upon receiving a connection request message from the communication server 260, the endpoint 120 requests a connection to the API server 240 that originated the message (e.g., using an identifier in the message). The endpoint 120 and API server 240 then connect and communicate the relevant data. Upon completing the data transfer, the connection between the API server 240 and the endpoint 120 may be terminated.

The type of connection between the API server 240 and the endpoint 120 (e.g., a HTTP over TLS connection) is typically higher latency and requires more overhead than the persistent connection between the communication server 260 and the endpoint. However, the type of connection between the API server 240 and the endpoint 120 is better suited for large data transfers and beneficially ensures data privacy and integrity.

The data store 210 maintains a database specifying various information pertaining to the endpoints 120. For example, the data store 250 stores security policy information for an enterprise such as, for example, parameters associated with the endpoint agents 125, firewall configurations, scan schedules, and scan results. The data store 210 also maintains unique machine identifiers for all of the endpoints 120. The data store 210 may store, in association with each of the machine identifiers, a state of the endpoint 120 and identifiers associated with messages sent to the endpoint. In addition, the store 210 maintains unique identifiers for all of the accounts that have access to the system via the administrative client 105.

Endpoints 120 may come online or offline at various times and may therefore miss messages from the API server 240 if they are sent when the endpoint 120 is offline. When an endpoint 120 first comes online (either from an offline state or when a new endpoint is registered in the data store 210), the endpoint may automatically request a connection to the API server 240. The endpoint 120 may provide an identifier of the last message it received to the API server 240 and the API server may compare the identifier against the data store 210 to determine if the endpoint missed any messages while offline. If the API server 240 determines that the endpoint 120 missed any messages, the API server determines which messages were missed and sends these messages if the messages have not expired. The messages may include messages related to configuration changes and commands. In an embodiment, certain commands may expire from the data store 210 after a time period. For example, if an endpoint 120 misses a scan command, the scan command may be canceled after a predefined time period (e.g., 24 hours).

A benefit of the described architecture of the cloud server 150 is that the required bandwidth of the API server 240 may be reduced because the endpoints 120 (which may exist in very large numbers) need not constantly poll the API server 240 for updates. Instead, the endpoints 120 only connect to the API server 240 when they determine that an update or command is available based on the connection request message received via the communication server 260. Furthermore, by utilizing a communication server 260 with a persistent connection to the endpoint 120, the messages can be communicated to the endpoints quickly without the endpoints constantly polling the communication server 260. The architecture also enables the number of instances of the API server 240 and the number of instances of the communication server 260 to scale independently. The number of instances of the communication server 260 is directly related to the total number of endpoints 120 that the cloud system is managing. If a new account is added with large number of endpoints 120, or new endpoints 120 are deployed within an existing account, each of those endpoints 120 will try to establish a connection with the communication server 260 and that may trigger new instances of communication servers 260. On the other hand, if a configuration setting is changed in an operating environment that has larger number of endpoints 120, all of those endpoints 120 of that environment may try to download their settings from the API server 240 at the same time which may increase the load on the API servers 240 and that may trigger new instances of the API server 240. Once all the settings are downloaded, the load on the API servers 240 may reduce and thus the API server 240 may again scale down back to an effective operating level.

Further still, the architecture beneficially enables updating of the API server 240 independently of updating of the communication server 260. The independent updating enables the cloud server 150 to be updated in a more efficient manner with less disruption to the endpoints 120 it serves.

Figure 3:
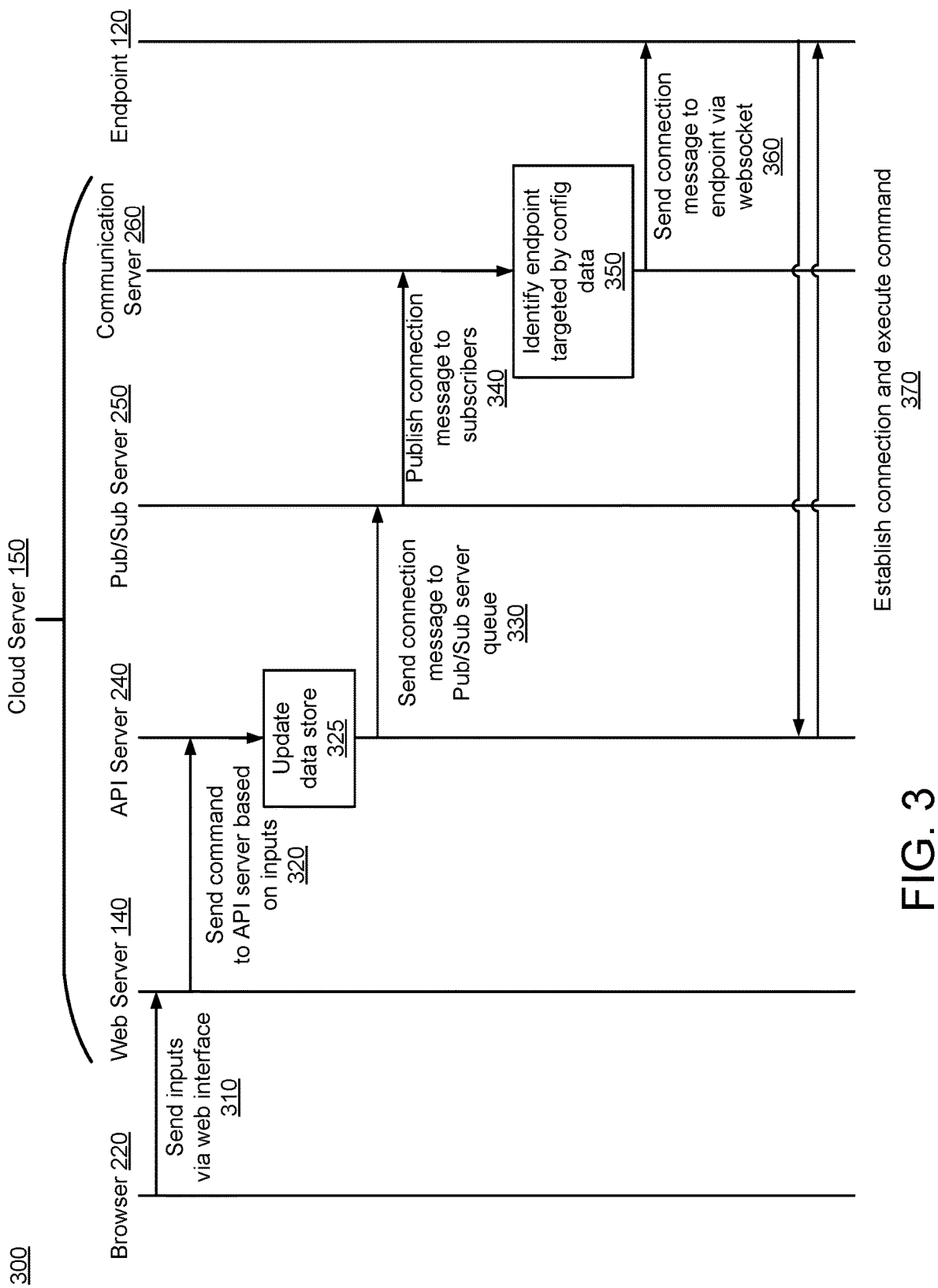
FIG. 3 is a flow diagram illustrating a process for communicating with an endpoint in a cloud-based endpoint security system.

FIG. 3 is a flow diagram illustrating an embodiment of a process for sending a command to an endpoint 120 to update a configuration or perform another specified task. A browser 220 sends 310 inputs to the web server 140 via a web interface. The inputs may be based on interactions by an administrator with a web page provided by the web server 140 and may include updated configuration information or requests for the endpoints 120 to perform particular tasks. In some embodiments, the inputs sent from the browser 220 to the web server 140 are in a JavaScript Object Notation (JSON) format.

The web server 140 next sends 320 a command derived from the inputs to the API server 240. The command may include associated configuration data for updating the endpoints 120. The API server 240 determines based on the inputs and identifiers in the data store 210 associated with the administrative account, the machine identifiers of endpoints 120 to be targeted by the command. The API server 240 updates 325 the data store 210 with the command and any associated configuration data.

The API server 240 sends 330 a connection request message to the queue of the pub/sub server 250. The connection request message comprises a request for an endpoint 120 to connect to the API server 240 to receive the command and any associated configuration data. The message includes, for example, the machine identifier of the endpoint 120 targeted by the command. The pub/sub server 250 publishes 340 the message by sending the message to a subscribing communication server 260. The endpoint 120 targeted by the configuration data is next identified 350 by the communication server 260. Each instance of the communication server 260 maintains persistent connections to the endpoints 120 it serves. If the endpoint 120 targeted by the message is served by the communication server 260, the communication server 260 routes the message to the corresponding endpoint based on the machine identifier within the message via the persistent connection.

In response to the endpoint 120 receiving the message from the communication server 260, the endpoint and the API server 240 establish 370 a temporary connection. The API server 240 communicates the command to the endpoint 120 via the temporary connection. The command may include, for example, configuration data to the endpoint 120 to update a configuration of the endpoint agent 125 based on the configuration data. Alternatively, the API server 240 may generate a command that causes the endpoint 120 to execute a task such as running a scan, providing scan data, or providing status information to the API server 240. After receiving the configuration data at the endpoint 120, the endpoint terminates the connection with the API server 240.

The above-described architecture and process beneficially provides a cloud-based security system that can implement a security policy on a large number of endpoints 120. An indirect communication channel to the endpoints 120 via the pub/sub server 250 and the communication servers 260 provides a low overhead communication path to alert the endpoints 120 when updates are available without the endpoints constantly polling the API server 240. The architecture is furthermore highly scalable, thus enabling an enterprise to quickly add or remove endpoints 120 without substantial administrative burden.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for updating a security policy on a plurality of endpoints in a networked computer environment, the method comprising:
   receiving, at an API server, a command including configuration data for configuring the plurality of endpoints within an enterprise network;
   generating a connection request message identifying the plurality of endpoints targeted by the command;
   identifying, by a communication server, a target endpoint identified by the connection request message;
   sending, by the communication server, the connection request message to the identified endpoint via a persistent connection;
   receiving by the API server, a connection request from the identified endpoint in response to the identified endpoint receiving the connection request message;
   establishing a temporary connection between the API server and the identified endpoint in response to the request; and
   communicating, by the API server, the command to the identified endpoint over the temporary connection.

2. The method of claim 1, further comprising:
   updating, by the API server, a database based on the command, the database storing configuration information relating to the plurality of endpoints.

3. The method of claim 1, wherein the API server and communication server are implemented as virtual servers in a cloud computing environment coupled to the endpoints over a wide area network.

4. The method of claim 1, further comprising:
   detecting a set of new endpoints joining the enterprise network;
   responsive to the detecting the set of new endpoint, generating a number of a new virtual server instances of the communication server, the number of new virtual server instances based on a number of the new endpoints; and
   assigning each of the new virtual server instances to a subset of the new endpoints.

5. The method of claim 1, wherein the persistent connection maintained between the communication server and the endpoints is a WebSocket connection.

6. The method of claim 1, further comprising:
   the API server receiving, from the identified endpoint, an identifier for the received message;
   performing a comparison, by the API server, of the received identifier to message identifiers saved in a data store associated with the identified endpoint;
   determining, at the API server, whether the identified endpoint missed one or more prior commands intended for the identified endpoint based on the comparison; and
   providing, by the API server, the identified endpoint with the missed one or more prior commands.

7. The method of claim 1, wherein the command comprises a command to perform at least one of: updating an endpoint agent executing on the identified endpoint, updating a configuration parameter associated with an endpoint agent executing on the identified endpoint, reconfiguring a firewall setting on the identified endpoint, changing a scheduled scanning frequency of the identified endpoint, disabling or enabling security features of the endpoint agent executing on the identified endpoint, and requesting status information from the identified endpoint.

8. A non-transitory computer-readable storage medium storing instructions for updating a security policy on a plurality of endpoints in a networked computer environment, the instructions when executed by one or more processors causing the one or more processors to perform steps comprising:
   receiving, at an API server, a command including configuration data for configuring the plurality of endpoints within an enterprise network;
   generating a connection request message identifying the plurality of endpoints targeted by the command;
   identifying, by a communication server, a target endpoint identified by the connection request message;
   sending, by the communication server, the connection request message to the identified endpoint via a persistent connection;
   receiving by the API server, a connection request from the identified endpoint in response to the identified endpoint receiving the connection request message;
   establishing a temporary connection between the API server and the identified endpoint in response to the request; and
   communicating, by the API server, the command to the identified endpoint over the temporary connection.

9. The non-transitory computer-readable storage medium of claim 8, the steps further comprising:
   updating, by the API server, a database based on the security policy, the database storing configuration information relating to the plurality of endpoints.

10. The non-transitory computer-readable storage medium of claim 8, wherein the API server and communication server are implemented as virtual servers in a cloud computing environment coupled to the endpoints over a wide area network.

11. The non-transitory computer-readable storage medium of claim 8, the steps further comprising:
   detecting a set of new endpoints joining the enterprise network;
   responsive to the detecting the set of new endpoint, generating a number of a new virtual server instances of the communication server, the number of new virtual server instances based on a number of the new endpoints; and
   assigning each of the new virtual server instances to a subset of the new endpoints.

12. The non-transitory computer-readable storage medium of claim 8, wherein the persistent connection maintained between the communication server and the endpoint is a Web Socket connection.

13. The non-transitory computer-readable storage medium of claim 8, the steps further comprising:
   the API server receiving, from the identified endpoint, an identifier for the received message;
   performing a comparison, by the API server, of the received identifier to message identifiers saved in a data store associated with the identified endpoint;
   determining, at the API server, whether the identified endpoint missed one or more prior commands intended for the identified endpoint based on the comparison; and
   providing, by the API server, the identified endpoint with the missed one or more prior commands.

14. The non-transitory computer-readable storage medium of claim 8, wherein the command comprises a command to perform at least one of: updating an endpoint agent executing on the identified endpoint, updating a configuration parameter associated with an endpoint agent executing on the identified endpoint, reconfiguring a firewall setting on the identified endpoint, changing a scheduled scanning frequency of the identified endpoint, disabling or enabling security features of the endpoint agent executing on the identified endpoint, and requesting status information from the identified endpoint.

15. A security system for implementing a security policy on a plurality of endpoints in a networked computer environment, the security system comprising:
   one or more computer processors; and
   one or more non-transitory computer-readable storage media, the storage media storing computer program instructions executable by the one or more computer processors to perform steps comprising:
      receiving, at an API server, a command including configuration data for configuring the plurality of endpoints within an enterprise network;
      generating a connection request message identifying the plurality of endpoints targeted by the command;
      identifying, by a communication server, a target endpoint identified by the connection request message;
      sending, by the communication server, the connection request message to the identified endpoint via a persistent connection;
      receiving by the API server, a connection request from the identified endpoint in response to the identified endpoint receiving the connection request message;
      establishing a temporary connection between the API server and the identified endpoint in response to the request; and
      communicating, by the API server, the command to the identified endpoint over the temporary connection.

16. The security system of claim 15, the steps further comprising:
   updating, by the API server, a database based on the command, the database storing configuration information relating to the plurality of endpoints.

17. The security system of claim 15, wherein the API server and communication server are implemented as virtual servers in a cloud computing environment coupled to the endpoints over a wide area network.

18. The security system of claim 15, the steps further comprising:
   detecting a set of new endpoints joining the enterprise network;
   responsive to the detecting the set of new endpoint, generating a number of a new virtual server instances of the communication server, the number of new virtual server instances based on a number of the new endpoints; and
   assigning each of the new virtual server instances to a subset of the new endpoints.

19. The security system of claim 15, wherein the persistent connection maintained between the communication server and the endpoints is a Web Socket connection.

20. The security system of claim 15, the steps further comprising:
   the API server receiving, from the identified endpoint, an identifier for the received message;
   performing a comparison, by the API server, of the received identifier to message identifiers saved in a data store associated with the identified endpoint;
   determining, at the API server, whether the identified endpoint missed one or more prior commands intended for the identified endpoint based on the comparison; and
   providing, by the API server, the identified endpoint with the missed one or more prior commands.

* * * * *